Nov. 9, 1937.  J. S. McWHIRTER  2,098,459
CAR TRUCK
Filed June 11, 1935  3 Sheets-Sheet 2
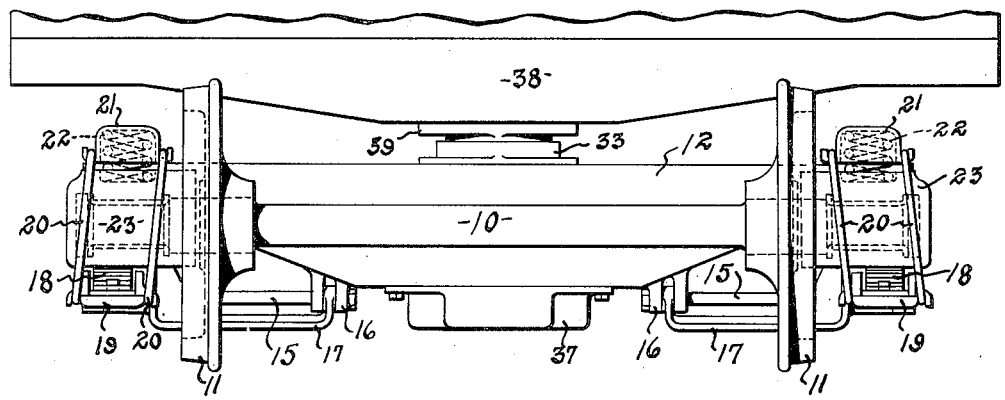
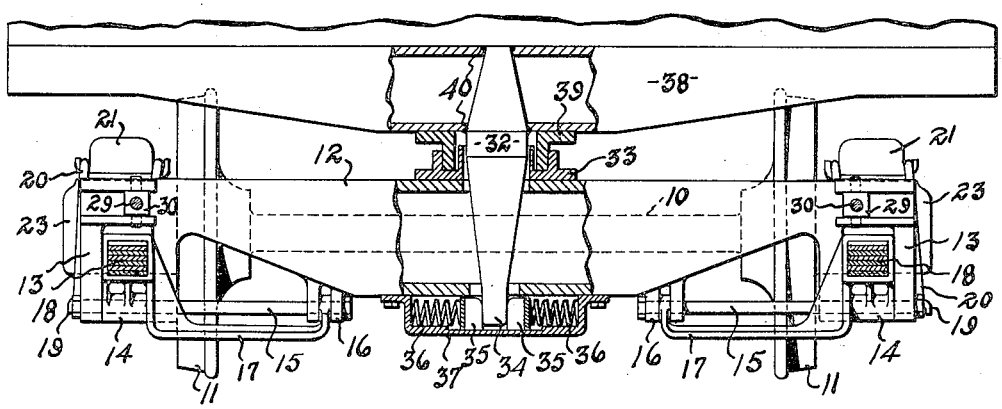
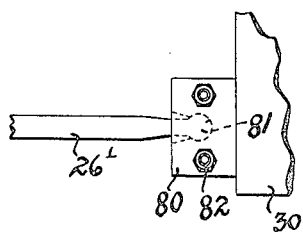 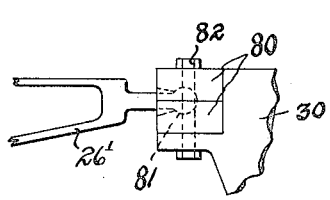
INVENTOR
John S. McWhirter
BY Darby & Darby
ATTORNEYS Nov. 9, 1937.  J. S. McWHIRTER  2,098,459
CAR TRUCK
Filed June 11, 1935  3 Sheets-Sheet 3
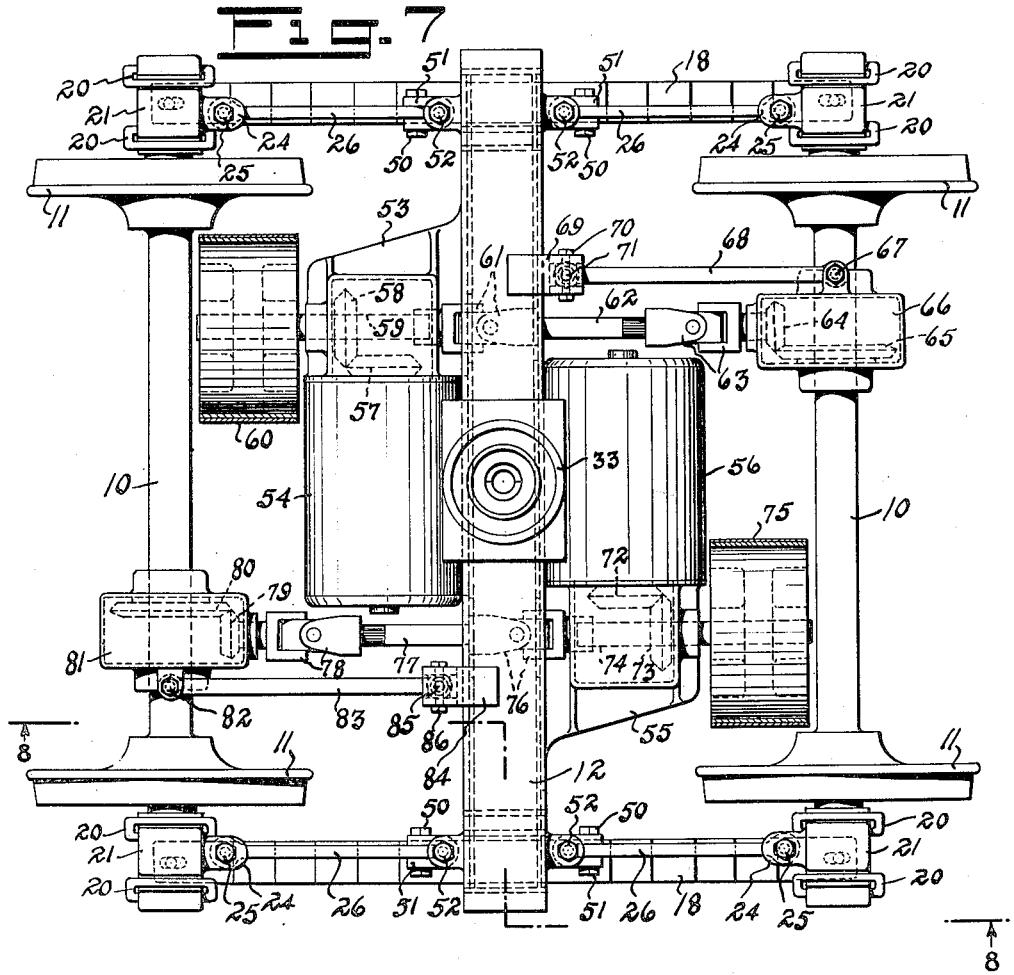
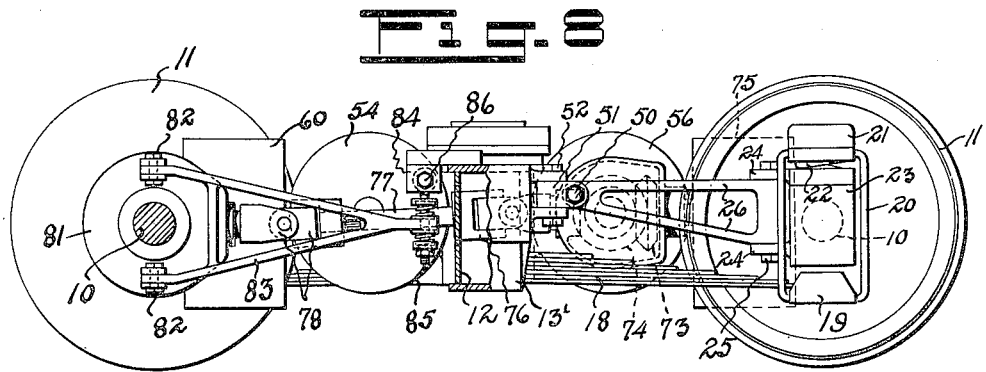
INVENTOR
John S. McWhirter
BY Darby & Darby
ATTORNEYS Patented Nov. 9, 1937

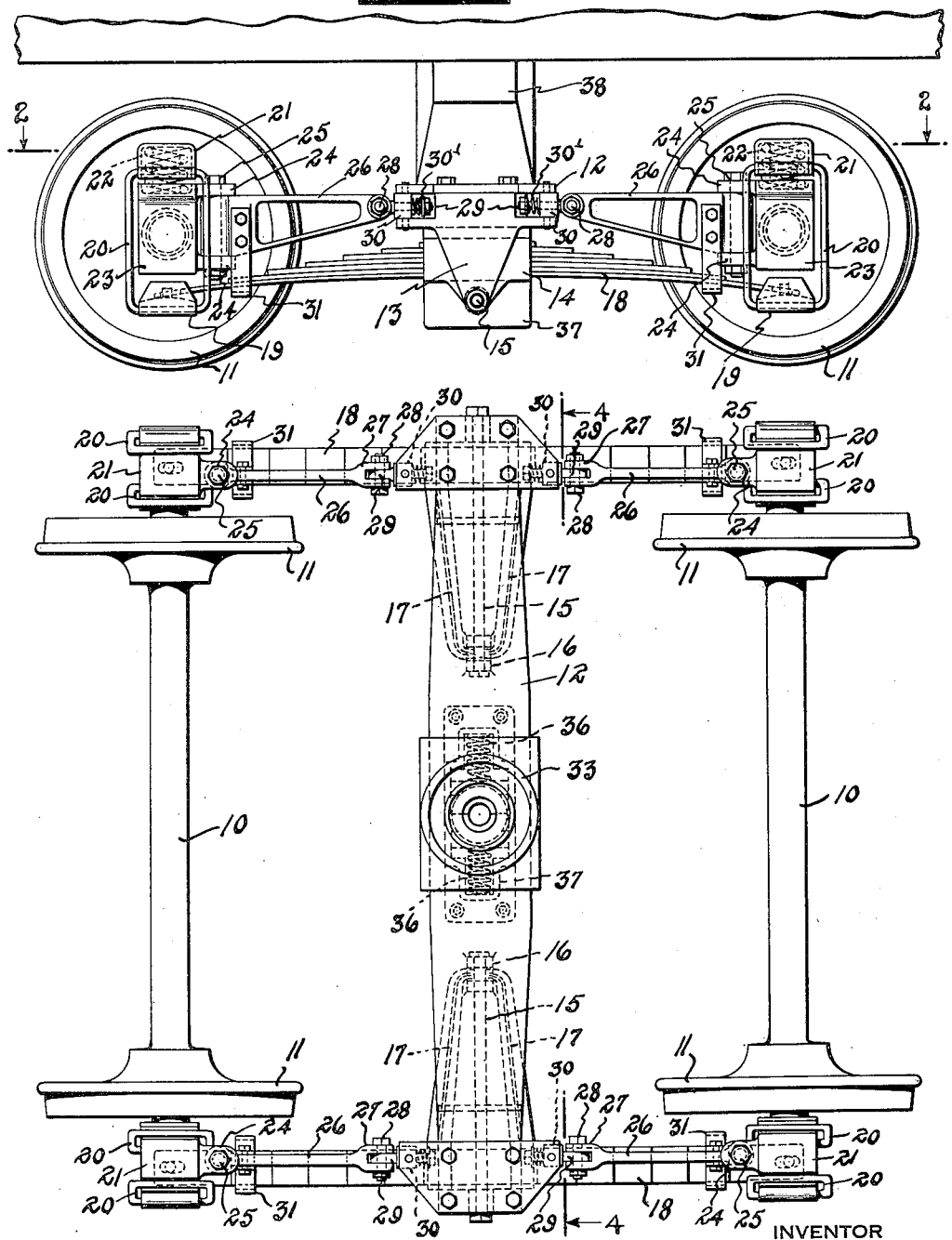

2,098,459

UNITED STATES PATENT OFFICE 2,098,459

CAR TRUCK

John S. McWhirter, Southport, Conn.

Application June 11, 1935, Serial No. 26,011

13 Claims. (Cl. 105—182)

This invention is concerned with an improved form of construction for vehicle trucks of the type employed upon street cars, subway cars, railway cars, and the like.

An important object of this invention is to provide a light weight, flexible, non-rigid car truck which will absorb the various stresses and strains incident to its use.

An important object of this invention is to do away with the usual massive and rigid truck frame as now employed in which the wheels are journaled so as to be permanently held against relative movement with respect to the frame, except in well defined and restricted paths of movement.

Another object of this invention is to provide a light weight flexible car truck frame upon which the wheels are pivotally mounted in pairs so that the truck may respond to stresses and strains such as occur on tracks in poor surface or alignment, in going around curves, during derailments, and the like, without springing the truck frame as commonly occurs with the present rigid frame trucks.

A further object of this invention is to provide an improved king pin mounting which eliminates the necessity of using side bearings now commonly employed on rigid frame car trucks.

These and many other objects as will appear from the following description are secured by means of the invention herein disclosed, several forms of which are illustrated in the attached drawings.

This invention resides substantially in the combination, construction, arrangement and relative location of parts, all as will be described in full detail below.

In the drawings,

Figure 1 is a side elevational view of a car truck in accordance with this invention;

Figure 2 is a top plan view thereof substantially along the plane 2—2 of Figure 1;

Figure 3 is an end elevational view of this truck;

Figure 4 is a cross sectional view taken on the line 4—4 of Figure 2;

Figures 5 and 6 are plan and side elevational views of a modified connection between the side members of the frame and the bolster head;

Figure 7 is a top plan view of a slightly modified form of truck shown in combination with the driving motor; and Figure 8 is partially an elevational view of the modified structure and partly in cross section on the line 8—8 of Figure 7.

The most commonly used types of car trucks involve a construction which is centered around a massive, heavy, rigid, non-yielding truck frame upon which the wheels and other equipment are mounted. Because of the fact that the truck frame is made rigid and is intended to act as a rigid unit in use it is necessary to make it of greater mass and strength than is actually required thereof for carrying normal operating loads. It frequently occurs during derailments, wrecks, and the like that this massive rigid frame is sprung, requiring either extensive repairs to return it to use, or in some cases it must be discarded. The general purposes of this invention are to simplify and reduce the weight of the entire car truck which is accomplished by making the entire unit flexible so that it may yield and give under the stresses and strains encountered in use without danger of springing or misaligning it.

This is accomplished in accordance with this invention by building up a truck structure which is highly flexible, with the result that the frame itself is substantially lightened, thereby reducing its dead weight load.

These objects are accomplished without in any way sacrificing the necessary strength to adapt the truck for normal use. Furthermore, by reason of the construction employed the truck is not subject to misalignment as the result of derailments, moving around sharp curves, and the like.

Illustrated in Figs. 1 to 4 inclusive is one form of car truck in accordance with this invention. At 10 are the usual pair of axles which have secured thereto and spaced inwardly from their ends the pairs of wheels 11. At 12 is the bolster which may be cast or fabricated or built up in any desired manner. At the end of the bolster are the bolster heads 13 which, as shown in Fig. 4, terminate in downwardly extending spaced parallel arms between which a saddle 14 is pivotally mounted upon a shaft 15. One end of the shaft is mounted in the arms of the bolster head and the other end is mounted in a pair of heavy lugs 16 formed on the under side of the bolster. The saddle 14 is provided with a pair of arms 17 which unite at the ends lying between the lugs 16 so as to be journaled on the shaft 15. The leaf spring 18 is clamped near its center in the saddle 14. The ends of this spring rest upon the saddles 19 which are provided with pins which extend through elongated apertures in the ends of the leaf springs. The saddles 19 are connected by pairs of links 20 with the upper saddles 21 which rest upon heavy coil springs 22 in turn mounted upon the tops of the journal boxes 23. The axles 10 are mounted in bearings within the journal boxes.

The journal boxes 23 are mounted on the spaced arms 24 between which extend the pivoted bolts 25 which pass through the ends of the links 26. These links extend towards the bolster heads and terminate in forked ends 27 which are pivotally connected by means of the pivot pins 29 to eye bolts 20 which are in turn longitudinally slidable in trunnions 30 under the influence of coil springs 30'. The blocks 30 are pivotally mounted for oscillation on vertical axes in the bolster heads 13 (Figure 1). Mounted upon the links and secured thereto adjacent the journal housings are the safety hangers 31 which encircle the ends of the leaf springs 18 so as to prevent their falling to the ground if the lowermost leaf should break.

The king pin is shown at 32 in Figure 4. It passes through apertures in the bolster, through a bearing plate 33 mounted upon the top of the aperture and a cooperating bearing member 39 secured to the bottom of the bolster 38 of the vehicle body, or frame, and extends into apertures therein. It is welded in place in the body bolster 38, as indicated at 40. The lower end 34 of the king pin rests between bearing members or shoes 35, which in turn are engaged by springs 36 so as to permit restricted movement of the king pin.

From the above description it will be seen that an exceedingly flexible car truck construction is provided which will permit of the truck adapting itself to and absorbing the various stresses and strains incident to its use. The main semi-elliptical leaf springs are pivotally mounted on the ends of the bolsters and carry the loads from the bolster to the axles through the swing links 20. The journal housings are pivotally interconnected by means of links with the bolster heads. Thus the axles and wheel pairs are permitted relative movement with respect to each other and the bolster within limits.

In Figures 5 and 6 is shown a modified form of connecting means between the links and the bolster heads. In this case the links 26' are provided with ball shaped heads 81 which fit in sockets formed in the blocks 80 and bolted to the bolster heads 30 by means of the bolts 82. This permits of a universal movement of the links 26' with respect to the bolster heads.

The construction shown in Figs. 7 and 8 illustrates a substantially similar truck construction in combination with the driving motors which are supported from the bolster, and which are not supported upon the axles in accordance with common practice. The truck frame is substantially similar to that previously described, and will not be reviewed in detail. In this case a still different form of connecting means is provided between the links 26 and the bolster 12. In this case the bolster heads are provided with parallel arms 5, as in the case of the structure of Figure 1, in which are pivotally mounted by means of the pivot pin 52, blocks 51 which in turn have pairs of parallel arms between which the ends of the links 26 lie, and to which they are connected by means of the pivot pin 50. This construction permits of relative movement between the links and the connected pairs with respect to the bolster heads in two directions at right angles to each other. The driving motors in this case diagrammatically illustrated at 54 and 56 are respectively mounted on the bolster by means of the heavy brackets 53 and 55 respectively. At 57 is a driving bevel gear mounted on the shaft of motor 54. This gear meshes with another bevel gear 58 secured to the shaft 59 journaled on bracket 53. On one end of the shaft 59 is the brake drum 60 and on the other end is a universal connecting joint 61 which connects it with the telescoping shaft 62. This shaft in turn is connected by a universal joint 63 in which it slides to a short shaft upon which a bevel gear 64 is mounted. This bevel gear meshes with a driven bevel gear 65 secured to the right hand axle 10. The gears 64 and 65 are mounted within a housing 66 through which the right hand axle 10 passes. On opposite sides of the axle the housing is connected by means of a forked link 68 and the pivot pin 67 to a bracket 69 secured to the bolster and pivotally connected to a pin 71 on which it pivots. This pin is provided with collars between which and the sides of the pivot end of the link 68 a pair of springs lie. The upper end of pin 71 is pivotally mounted in the bracket 69 by means of a pivot pin 70.

The relationship of the parts will be clear from Figure 8, wherein the link 83 is shown, which is the same as the link 68.

The other motor 56 is similarly provided with a bevel gear 72 meshing with the bevel gear 73 secured to the shaft 74 on one end of which is the brake drum 75 and on the other end of which is the universal connecting joint 76. This joint is mounted upon one end of a shaft 77, which in turn is connected telescopically to a universal connecting joint 78 to another short shaft upon which the bevel gear 79 is mounted. This bevel gear meshes with a bevel gear 80 secured to the left hand axle 10. A housing 81 encloses the gears 79 and 80 and is pivotally connected by means of the pins 82 to the forked end of the link 83. The other end of this link is pivotally mounted on a pin 85 between springs, as before described, which pin in turn is pivotally mounted on the pin 86 in the bracket 84.

By means of this construction the motors are disposed within the confines of the truck frame and are directly supported from the bolster rather than from the axle, as is commonly the practice today. The sectionalized drive shafts 62 and 77 between the motors and the axles include the relatively long links connected at each end by means of universal joints to the driving and driven parts. This arrangement permits the necessary relative movement between the axles and the motors, and at the same time reduces wear and strain because of the relatively great distance between the universal joints.

From the above description it will be apparent that this invention resides in certain principles of construction and relative location of parts which may be varied by those skilled in the art without departure from the scope thereof. I do not, therefore, desire to be strictly limited to the disclosure as given for purposes of illustration, but rather to the scope of the appended claims.

What I seek to secure by Letters Patent is:

1. A non-rigid vehicle truck comprising a bolster, leaf springs secured to the ends of said bolster, a pair of axles each having a pair of wheels thereon, journal boxes mounted on said axles, swing links interconnecting the ends of the leaf springs with the journal boxes, and side members each pivotally connected at one end to a journal box on a vertical axis and at the other end to the bolster on a vertical axis.

2. A non-rigid car truck comprising a bolster, a pair of leaf springs horizontally pivoted at their centers to the ends of the bolster, a pair of axles, each having a pair of wheels thereon, journal boxes in which the axles are mounted, means for connecting the ends of the leaf springs to adjacent journal boxes to permit relative transverse movement between the spring ends and the journal boxes, and side members pivotally interconnecting the adjacent journal boxes and bolster ends, the pivot axis of the side members at the journal boxes being vertical.

3. A non-rigid car truck comprising a bolster, saddles pivotally mounted on the ends of the bolster, leaf springs secured in said saddles, a pair of axles, each having a pair of wheels thereon, journal boxes mounted on the ends of the axles, means for supporting each end of each leaf spring on an adjacent journal box, and side links each pivotally connected at one end to a journal box and at the other end to the bolster to permit movements of the side links in vertical and horizontal planes.

4. A non-rigid car truck comprising a bolster, saddles pivotally mounted on the ends of the bolster, leaf springs secured in said saddles, a pair of axles, each having a pair of wheels thereon, journal boxes mounted on the ends of the axles, means for suspending each end of each leaf spring from an adjacent journal box to permit movement of the ends of the springs in the direction of the axles, and side links each pivotally connected at one end to a journal box and at the other end to the bolster, the pivotal connection of each link with the bolster comprising means for permitting relative movement between the link ends and the bolster in two directions.

5. A non-rigid car truck comprising a bolster, a saddle pivotally mounted on each end of the bolster, a leaf spring secured near its center on each saddle, a pair of axles, each having a pair of wheels thereon, means for mounting the ends of the leaf springs on adjacent journal boxes, arms secured to said saddles and pivotally connected to said bolster, and side links pivotally interconnecting the journal boxes with the bolster.

6. A non-rigid car truck of the type described, comprising a bolster, a saddle pivotally mounted on each end of the bolster, leaf springs secured to said saddles intermediate their ends, each saddle having a pair of inwardly extending arms pivotally connected to the bolster, a journal box for each end of each axle, means for supporting the ends of the leaf springs on adjacent journal boxes, and side links pivotally interconnecting the journal boxes with the bolster.

7. A non-rigid car truck of the type described, comprising a bolster, a saddle pivotally mounted on each end of the bolster, leaf springs secured to said saddles intermediate their ends, each saddle having a pair of inwardly extending arms pivotally connected to the bolster, a journal box for each end of each axle, means for suspending the ends of the leaf springs from adjacent journal boxes, side links pivotally interconnecting the journal boxes with the bolster, said means for suspending the ends of the leaf springs from the journal boxes comprising links, and spring means interposed between the upper ends of the links and the tops of the journal boxes.

8. A non-rigid car truck of the type described, comprising a bolster, a saddle pivotally mounted on each end of the bolster, leaf springs secured to said saddles intermediate their ends, each saddle having a pair of inwardly extending arms pivotally connected to the bolster, a journal box for each end of each axle, means for connecting the ends of the leaf springs to adjacent journal boxes, side links pivotally interconnecting the journal boxes with the bolster, said means for connecting the leaf springs to the journal boxes each comprising a pair of links, a bearing member interposed between the lower ends of the links upon which the ends of the springs rest, a bearing member interconnecting the upper ends of the links, and resilient means interposed between said last mentioned bearing member and the tops of the journal boxes.

9. A non-rigid car truck comprising a bolster, a pair of leaf springs pivotally mounted on the ends of the bolster, a pair of axles each having a pair of wheels thereon, journal boxes at each end of said axles, means for connecting the ends of the leaf springs to adjacent journal boxes, side links pivotally mounted at one end thereof on each journal box, and a universal joint connection between the other ends of the side links and the bolster.

10. A non-rigid car truck comprising a bolster, a pair of leaf springs supported from their centers at the ends of the bolster, a pair of axles each having a pair of wheels thereon, journal boxes in which the axles are mounted, means supported on the journal boxes upon which the ends of the springs rest, and links, each pivotally connected to the respective journal boxes and pivotally and slidably connected to the bolster.

11. A non-rigid car truck comprising a bolster, saddles pivotally mounted on the ends of the bolster on a horizontal axis, leaf springs secured in said saddles, a pair of axles each having a pair of wheels thereon, journal boxes mounted on the ends of the axles, means for pivotally interconnecting the bolster with the journal boxes, and transversely swingable means for suspending the respective ends of the springs from the journal boxes.

12. A non-rigid car truck comprising a bolster, saddles pivotally mounted on the ends of the bolster for pivoted movement in a vertical plane, springs mounted in the saddles intermediate the ends of the springs, means interconnecting the saddles with the bolster to hold them at right angles thereto, a pair of axles each having wheels secured to the ends thereof, journal boxes mounted on the axles, the ends of the springs being secured to the journal boxes for relative movement with respect thereto, a plurality of side members each pivotally connected to the journal boxes respectively so as to pivot about a vertical axis, and means for interconnecting the other ends of the side members with the bolster comprising a member pivotally mounted on a vertical axis on the bolster and pivotally connected to the side members on a horizontal axis.

13. A non-rigid car truck comprising a bolster, saddles pivotally mounted on the ends of the bolster for pivoted movement in a vertical plane, springs mounted in the saddles intermediate the ends of the springs, means interconnecting the saddles with the bolster to hold them at right angles thereto, a pair of axles each having wheels secured to the ends thereof, journal boxes mounted on the axles, the ends of the springs being secured to the journal boxes for relative movement with respect thereto, a plurality of side members each pivotally connected to the journal boxes respectively so as to pivot about a vertical axis, and means for connecting the other ends of the side members with the bolster to permit of pivoted movement of the side members in horizontal and vertical planes and relative longitudinal movement in the direction of their length with respect to the bolster.

JOHN S. McWHIRTER.